US006659773B2

(12) United States Patent
Roy et al.

(10) Patent No.: US 6,659,773 B2
(45) Date of Patent: Dec. 9, 2003

(54) MOTION TRANSDUCER SYSTEM

(75) Inventors: Philippe Roy, St-Bruno (CA); Michel Bérubé, Contrecoeur (CA); Michel Jacques, Lachenaie (CA)

(73) Assignee: D-Box Technology Inc., Longueuil (CA)

( * ) Notice: Subject to any disclaimer, the term of this patent is extended or adjusted under 35 U.S.C. 154(b) by 0 days.

(21) Appl. No.: 09/754,088

(22) Filed: Jan. 5, 2001

(65) Prior Publication Data
US 2001/0036868 A1 Nov. 1, 2001

Related U.S. Application Data

(63) Continuation-in-part of application No. 09/642,756, filed on Aug. 22, 2000, which is a continuation of application No. 09/034,266, filed on Mar. 4, 1998, now Pat. No. 6,139,324.

(51) Int. Cl.[7] .............................. E09B 19/16; E09B 9/08
(52) U.S. Cl. .............................. 434/55; 463/30; 472/59
(58) Field of Search ........................ 434/29, 30, 33–35, 434/46, 48, 55, 58–62, 67, 69, 307 R; 472/96, 97, 130; 463/30, 31, 35; 340/825.7, 825.71; 381/18, 150, 151, 300, 301, 333, 307; 345/701, 702

(56) References Cited

U.S. PATENT DOCUMENTS

| 4,251,140 A | | 2/1981 | Fogerty, Jr. | |
| 4,750,208 A | * | 6/1988 | Yamada et al. | 381/162 |
| 4,874,162 A | | 10/1989 | Trumbull et al. | |
| 4,879,849 A | | 11/1989 | Hollingsworth, III et al. | |
| 5,276,629 A | * | 1/1994 | Reynolds | 702/71 |
| 5,473,700 A | * | 12/1995 | Fenner, Jr. | 381/336 |
| 5,486,141 A | | 1/1996 | Ohga et al. | |
| 5,499,920 A | | 3/1996 | Trumbull | |
| 5,506,907 A | * | 4/1996 | Ueno et al. | 381/18 |
| 5,827,065 A | * | 10/1998 | McClintic | 434/29 |
| 5,853,330 A | | 12/1998 | Engstrand | |
| 5,857,986 A | * | 1/1999 | Moriyasu | 601/49 |
| 5,954,508 A | * | 9/1999 | Lo et al. | 434/55 |
| 6,413,090 B1 | * | 7/2002 | Shiina et al. | 434/55 |
| 6,422,941 B1 | * | 7/2002 | Thorner et al. | 463/30 |

FOREIGN PATENT DOCUMENTS

WO     WO 9608785     3/1996

OTHER PUBLICATIONS

Steve Vernon, Design and Implementation of AC–3 Coders, Dolby Laboratories, Inc, IEEE Tr. Consumer Electronics, vol. 41, No. 3 (Aug. 1995), pp. 1–6.*

* cited by examiner

Primary Examiner—Mark Sager
Assistant Examiner—Steven Ashburn
(74) Attorney, Agent, or Firm—C. Marc Benoit; Ogilvy Renault

(57) ABSTRACT

The system produces movements in a home entertainment chair. It has a motor controller and a plurality of movement generator units for generating small amplitude and low frequency movements in the viewers chair according to desired effects. A synchronization is achieved using an audio/video stream.

17 Claims, 12 Drawing Sheets

MOTION TRANSDUCER SYSTEM

The present application is a continuation-in-part of U.S. patent application Ser. No. 09/642,756 filed Aug. 22, 2000 which is a continuation of U.S. patent application Ser. No. 09/034,266 filed Mar. 4, 1998, now U.S. Pat. No. 6,139,324 the specification of which are hereby incorporated by reference.

FIELD OF INVENTION

This invention relates to tactile and movement sensation generation, and more particularly to tactile and movement sensation generation for home theatre and/or motor simulation systems.

BACKGROUND OF THE INVENTION

A century ago, the first movies did not include sound. The first sound tracks were music mimicking the action. A few inventions later, the spectator was finally able to hear at least the voice of the actors. From this point, improvements made the correlation between the sound track and the movie track more and more reliable. But viewers wanted more. The quest for realistic entertainment was beginning. A new need arose, mechanical sensations that would stimulate more deeply the senses of the users.

Unfortunately, providing a mechanical sensation to a viewer is not an easy task. In U.S. Pat. No. 4,874,162, Trumbull et al describe a motion picture amusement ride. This motion picture amusement ride works either in a manual mode or in an automatic mode. In the automatic mode, movements of each actuators are encoded on a tape cartridge which is synchronized with the movie. The apparatus described in this patent has a large size and it is therefore not convenient for a home theatre. Furthermore, in case of personal use, an individual may want to jump from one movie sequence to another, this may cause de-synchronization, as no specific synchronization scheme is described, which is fatal for the entertainment.

In U.S. Pat. No. 4,879,849, Hollingsworth, III et al describe a point-of-view motion simulator. As in the previous patent, the system described is not convenient for personal use. The synchronization is achieved using a single channel (the sixth channel) which provides a continuous stream of pulses which acts as start or sync signal. If synchronization may be obtained while playing the movie from the beginning to the end, the synchronization may be hard to maintain when a user wants to jump from a movie sequence to another. Finally, this approach by its core synchronization mechanism wastes an entire channel that will not be available anymore to the user. More fundamentally, the movie track may be altered in order to be used with this invention.

Therefore there is a need for a method and apparatus to provide motion sensations for a spectator watching a movie sequence without de-synchronization issues.

SUMMARY OF THE INVENTION

It is an object of the present invention to provide time stamps using an incoming data stream of information.

It is an object of the present invention to synchronize an effect with a data stream.

It is another object of the present invention to provide motion effects for a video track or a sound track.

Yet another object of the present invention is to create motion effects for a sound track or a movie track.

It is another object of the present invention to provide a method and apparatus to store and retrieve efficiently motion effects that may be played with respect to a sound track or video track.

According to one aspect of the present invention, there is provided an apparatus for generating motion effects for at least one actuator using an audio/video source stream signal, the apparatus comprising a track analyzer receiving the stream signal and performing a track analysis of the stream signal to produce a time variable characteristic signal, an effect generator receiving the time variable characteristic signal and generating at least one effect according to at least one rule, and a movement generator receiving the at least one effect and compiling the at least one effect to provide a single signal to each of the at least one actuator.

According to another aspect of the invention, there is provided a method for generating motion effects using at least one actuator with respect to an audio/video source, the method comprising the steps of receiving a signal from the audio/video source, analyzing the signal to generate a second signal, using the second signal and a rule to provide at least one effect; and compiling the second signal in order to provide a third signal to each of the at least one actuator according to said at least one effect.

According to another aspect of the invention, there is provided a method for providing haptic and motion sensations to at least one viewer in a simulator environment, the method comprising the steps of providing at least three actuators supporting at least one seat for the viewer, the actuators being adapted to move the seat and the viewer with small amplitudes at a frequency representing mechanical vibration, generating a vibration signal representing a level of vibration in the seat corresponding to a level of vibration associated with a virtual environment at each point in time, generating a visual cue signal representing a reciprocal visual cue movement in the seat corresponding to motion in the virtual environment at each point in time, converting the vibration signal into a first actuator position value for all of the actuators, converting the visual cue signal into second actuator position values for the actuators for causing at least a tilt in the seat, combining the first position value and the second position values to obtain an activation control value for each of the actuators, and supplying the control value to the actuators in real time.

BRIEF DESCRIPTION OF THE DRAWINGS

The invention will be better understood with the following description, together with the accompanying drawings, in which.

DETAILED DESCRIPTION

According to one object of the present invention, there is described a way to add a new dimension to an audio/video source by correlating to, either the sound track or the video track effects, which are transmitted to a group of actuators which create movement sensations to a user. The effects are either automatically generated according to one embodiment of the present invention. In another embodiment of the present invention, the effects are already pre-programmed by an operator and stored in a database.

Figure 1:
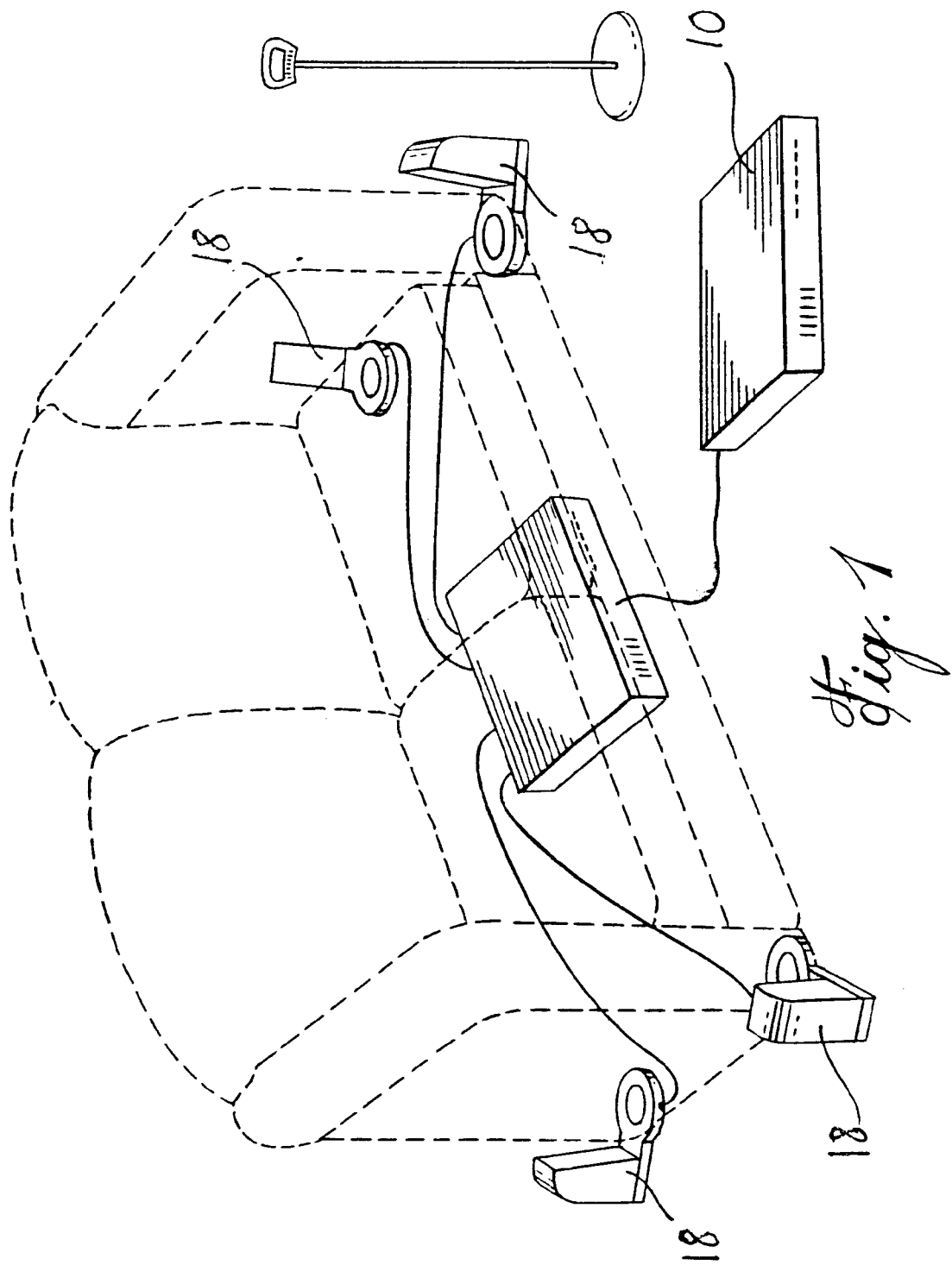
FIG. 1 is a drawing which shows one embodiment of the invention; the apparatus is used with a sofa; four actuators are located under each leg of the sofa.
Figure 2:
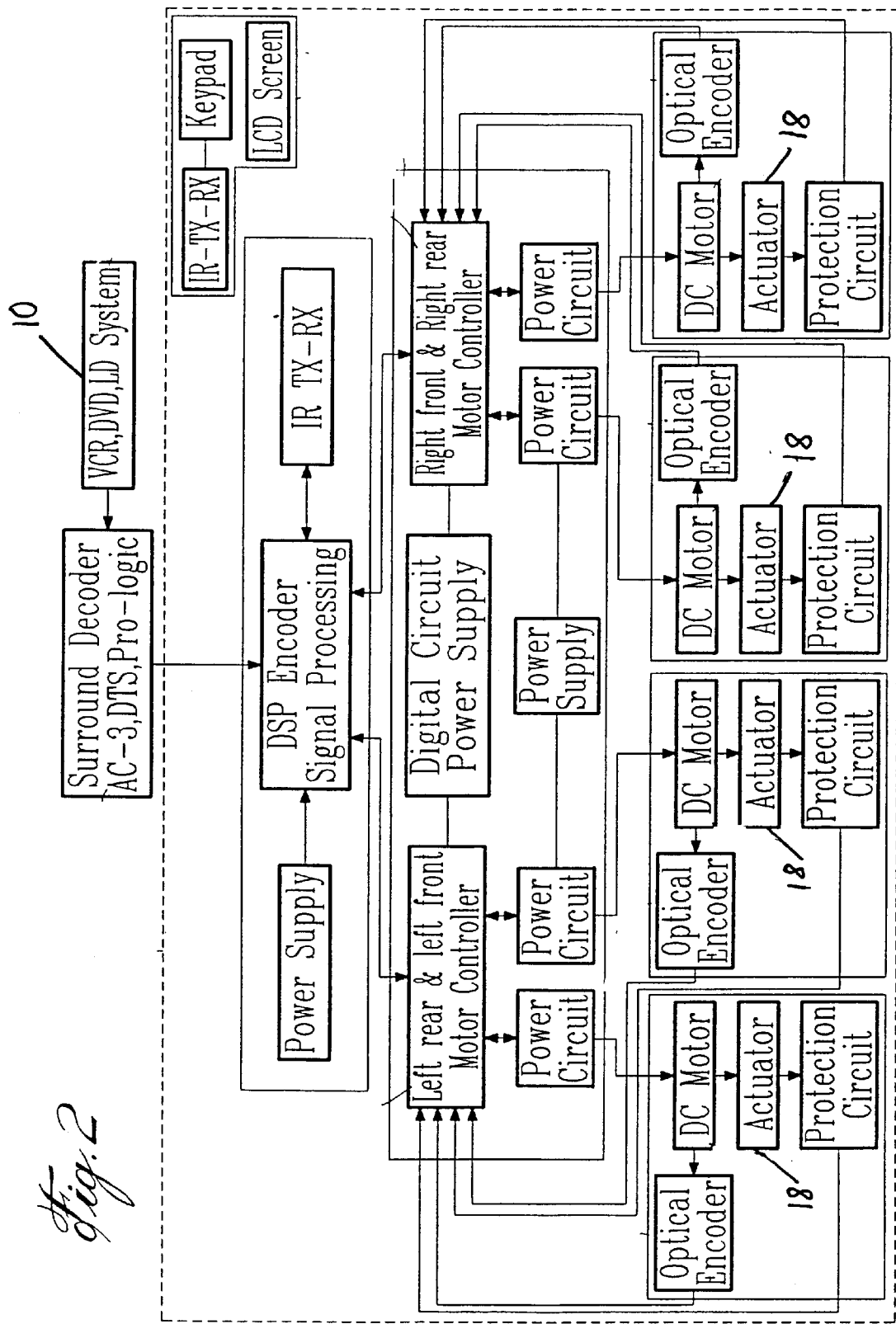
FIG. 2 is a block diagram of an overview of the system; an audio/video source provides signals to a processing unit which controls each actuators.

FIG. 1 shows an overview of the invention. A sofa is used and actuators 18 are placed under each legs of the sofa. By performing height variation, the actuators provide movement sensations to the users seated on the sofa. It will be appreciated that a viewer may be also a player when using this invention while playing for instance a flight simulation game. In such a case, the invention will provide him realistic movement sensations. In a simulation, the invention may provide the viewer both small amplitude signals at a frequency of at least 50 Hz (vibrations) and motion cue signals.

Figure 3:
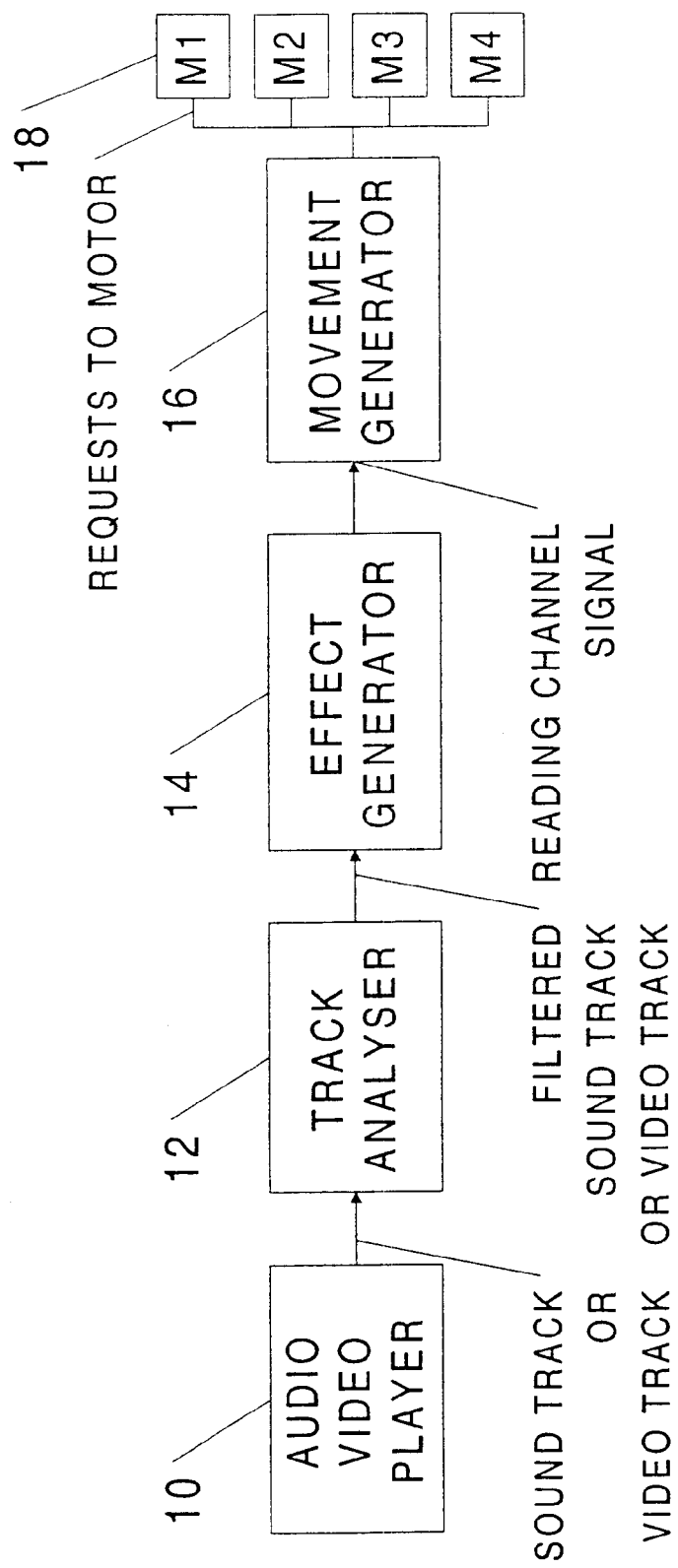
FIG. 3 is a block diagram which shows one embodiment of the present invention; a audio/video player provides a sound track or a video track to a track analyzer, which provides a filtered sound track or video track signal to an effect generator, which provides reading channel signal to a movement generator.

Now referring to FIG. 3, there is shown one embodiment of the present invention.

A main encoder module receives the sound signals from a video system such as a digital video disk (DVD or LD), a VCR system, a computer or a simple TV set and performs a digital sound signal analysis in order to output movement codes. Any source of video signal that also comprises a form of sound signals, such as analog or digital encoded sound signal may be employed as well, such as a satellite decoder (SAT) or a PC running a video game which creates a virtual environment. All these signals are received by the main encoder. The main encoder is preferably a digital signal processing unit that processes the incoming form of sound signal and outputs toward the motor controlling means a series of movement action codes designating the movement sensations the movement generator means are to produce. The movement action codes are preferably strings of digital data that the motor controller uses for outputting a power drive signal for powering the motors in order to produce the movements in accordance with the current sound signal read from the video presentation soundtrack.

In another preferred embodiment of the present invention, the system comprises a remote controller that allows a movie viewer to turn ON and OFF the system or even to adjust the characteristics of the movements. For example, switching between movement modes, such as an automatic mode, a music mode or the movie mode would be possible. Choosing the type of movements to be generated for a given movie would be also possible, such as choosing science-fiction movements when watching a science-fiction movie. Each of these modes may have predetermined kinds of movements recorded in databases and when the movie viewer selects a mode, these characteristics of the movements are read and applied to the movement. In another variant of the invention, this feature involves the presence of an encoded mode for reading codes specific to a particular movie. For example, the main encoder may comprise encoded movements for particular movies and when these movies are played these codes representing encoded movements may provided even more accurate movements to be produced.

More precisely, the system comprises, in one embodiment of the present invention, a track analyzer 12, an effect generator 14, a movement generator 16 and a group of actuators 18. An audio/video player 10 provides a sound track or a video track signal to the track analyzer 12. In one embodiment, the audio/video source 10 is a DVD player. The track analyzer 12 performs filtering on the sound track or video track in order to be able to provide a filtered signal to an effect generator 14. According to this filtered signal, the effect generator 14 is able to generate effects. Theses effects are sent to the movement generator 16 which compiles the effects provided by the effect generator 14 and sends the results to a group of actuators 18.

Figure 4:
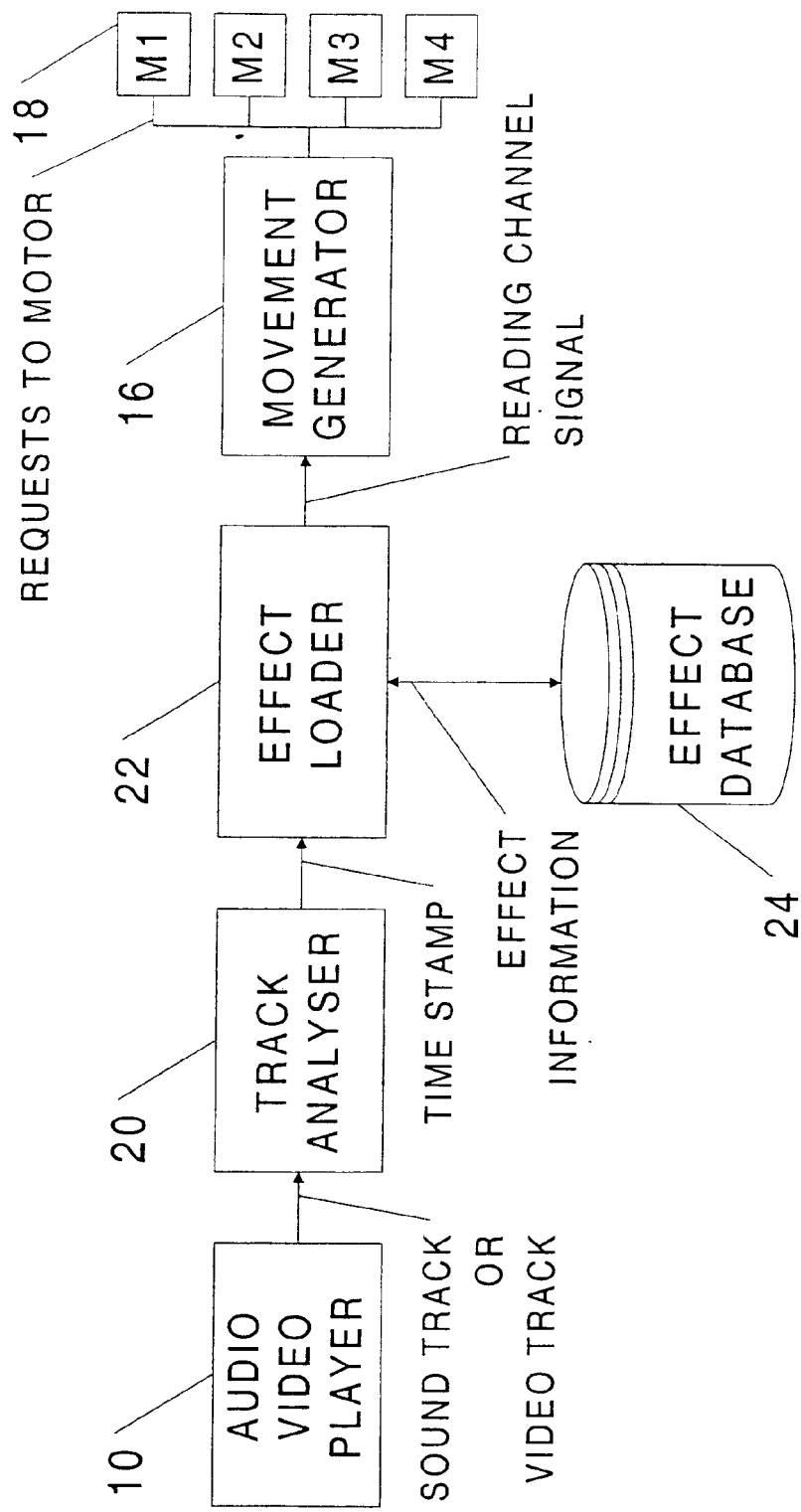
FIG. 4 is a block diagram of another embodiment of the present invention, and which comprises a track analyzer, an effect loader, an effect database and a movement generator.

Now referring to FIG. 4 of the present invention, there is shown another embodiment of the present invention wherein, the effects for a specific movie have already been created by an operator. The system comprises in this embodiment a track-analyzer 20, an effect loader 22, an effect database 24, a movement generator 16, and a group of actuators 18. An audio/video player 10, which is, in one embodiment of the present invention, a DVD player, provides a sound track or a video track to a track analyzer 20. The track analyzer 20 performs an analysis of the video track or sound track provided by the audio/video player 10. The analysis further explained in the following description comprises an extraction of the time for synchronization purposes. Time stamps are provided by the track analyzer 20 to the effect loader 22. The effect loader 22 retrieves effects from an effect database 24 according to the time stamps and provides the effects to the movement generator 16 which compiles the effects provided by the effect loader 22 and send the results to a group of actuators 18.

Figure 5:
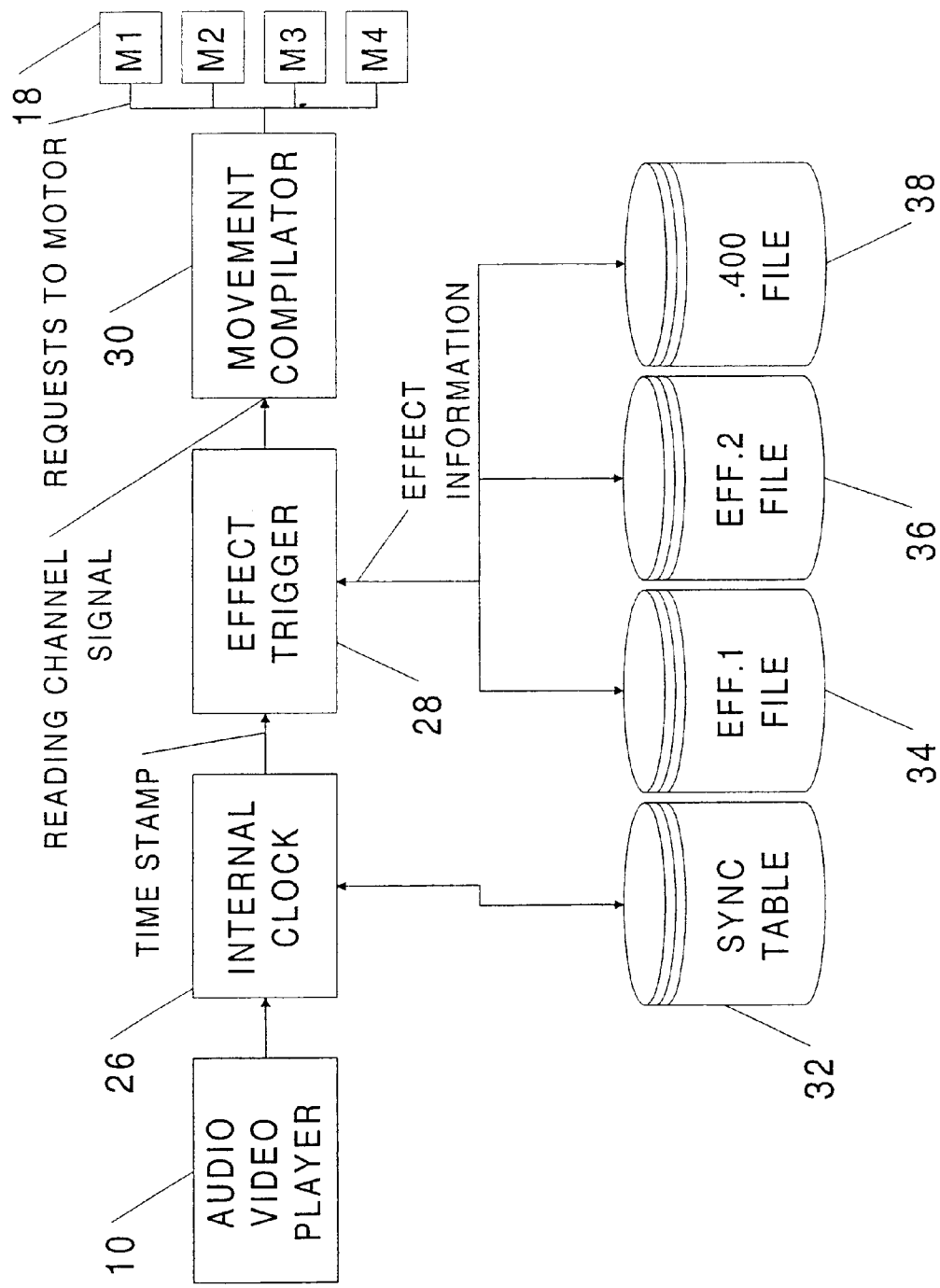
FIG. 5 is a block diagram of the preferred embodiment of the present invention which comprises a synchronization table, an EFF.1 file, an EFF.2 file and a .400 file.

According to FIG. 5 of the present invention, there is shown an embodiment of the present invention wherein the effects related to a specific movie have already been created by an operator as in the embodiment described in FIG. 4. The audio/video player 10, which is in the embodiment a DVD player outputs an AC3 or DTS signal in S/PDIF format (IEC61937) using a RCA connector. In another embodiment of the present invention, the optical output of an audio/video source may be used. The signal then enters an internal clock 26. The purpose of the internal clock 26 is to provide an accurate time stamp. This accurate time stamp will refer to the elapsed time from the beginning of the audio/video sequence.

Figure 6:
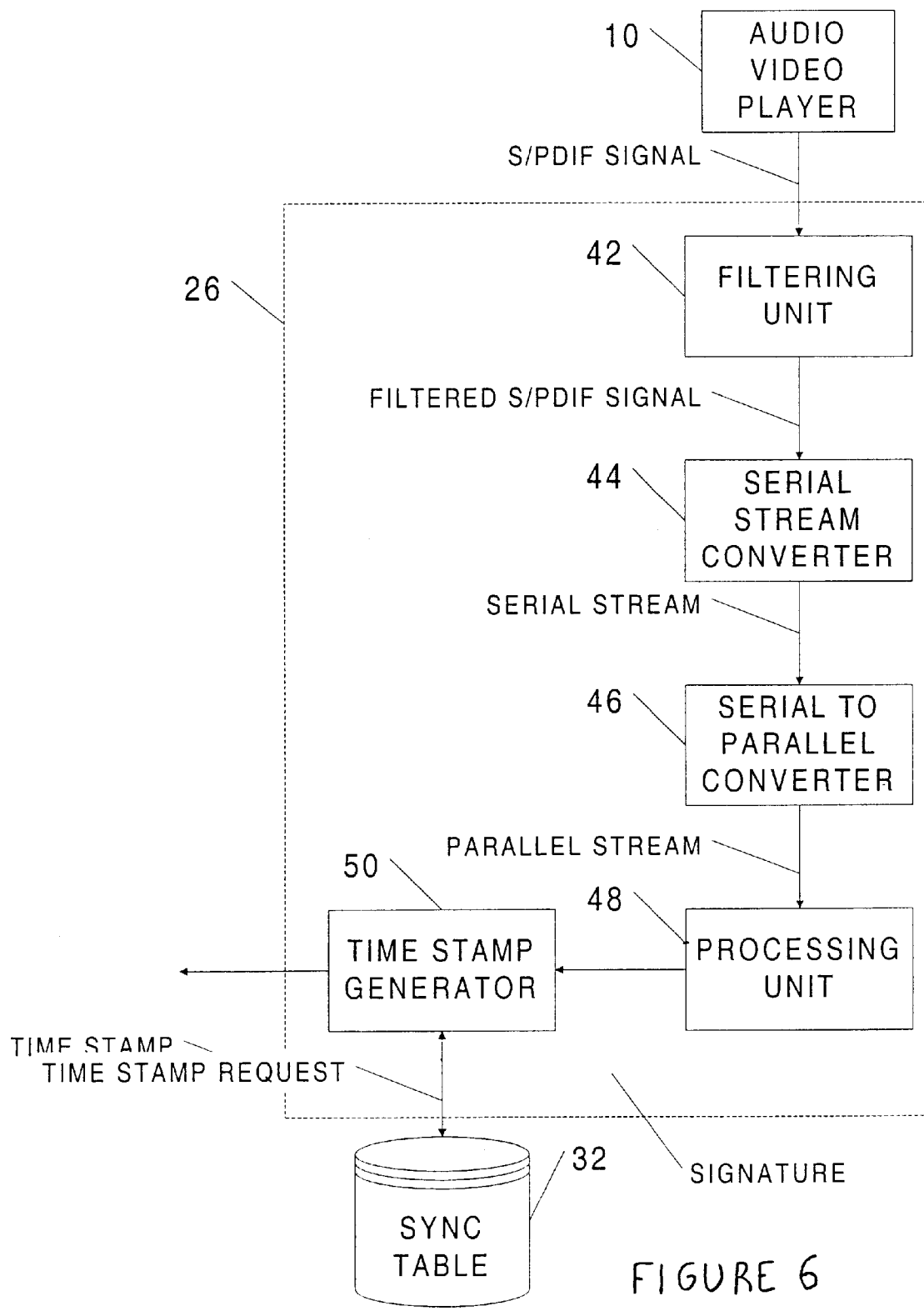
FIG. 6 is a block diagram of the internal clock; which comprises a filtering unit, a serial stream converter, a serial to parallel converter, a processing unit and a time stamp generator.

FIG. 6 shows the components of the internal clock 26 of one embodiment of the present invention.

The internal clock comprises a filtering unit 42, a serial stream converter 44, a serial to parallel converter 46, a processing unit 48 and a time stamp generator 50. In the preferred embodiment, the filtering unit 42 is a differential CMOS line driver and receiver pair such as DS89C21 from National. The filtering unit 42 can detect signal as low as 200 mV and it operates over 20 Mbps. The S/PDIF signal is therefore converted into a clean signal. A serial stream converter 44 decodes the filtered signal according to S/PDIF standard. It de-multiplexes the filtered signal to provide data in a serial way. In the preferred embodiment, the serial stream converter 44 is a CS8412 from Cirrus Logic. The serial signal is then received by a serial to parallel converter 46. The serial to parallel converter 46 allows a conversion of the signal into a 16 bit parallel signal.

In the preferred embodiment, the conversion of the serial signal into a parallel signal is performed using a shift register 74HC595 from Philips and a Programmable Logic Device (PLD) GAL16V8D. The programmable logic device receives the shifted signal provided by the shifted register and outputs a parallel signal. The 16 bit parallel signal is received by a processing unit 48. The processing unit 48 collects each 16 bit frames and rebuilds the frames splitted into an S/PDIF signal by the audio/video player 10. The boundaries of each frame are detected by the firmware of the processing unit 48. In the preferred embodiment, the processing unit 48 is a Texas Instruments TMS320C542 DSP. After detection of the boundaries of each frame, a group of bits is extracted in order to create a signature. One signature is therefore generated by each frame. In the case of an AC3 signal and in the preferred embodiment, the signature comprises the CRC1 field which is a 16 bit CRC located at the beginning of the frame, a byte located at ⅕ of the frame, one byte located at ⅖ of the frame, one byte located at ⅗ of the frame, one byte located at ⅘ of the frame and the CRC2 field which is a 16 bit CRC located at the end of the frame. The signature has therefore a fixed length of 64 bit. It is important to note that an object of the above signature creation is to obtain a good statistical distribution of the signature to avoid their repetition. It will be appreciated that the signature comprises two different CRC fields (CRC1 and CRC2). These two CRC are computed over two different parts of the digital audio frame. Therefore, 32 bits are highly statistically distributed information. They represent $2^{32}$ different combinations possible. In the case of a AC3 signal, 31.25 frames are used per second. Each frame therefore lasts 32 ms. In a 3 hours movie, 337500 frames will be used (3Ç3600Ç31.25), which is far smaller than $2^{32}$ combinations. Experimentations confirm that very few signatures are identical. However, in the case of non-uniqueness of a frame, special operations are generated as explained below.

Figure 7:
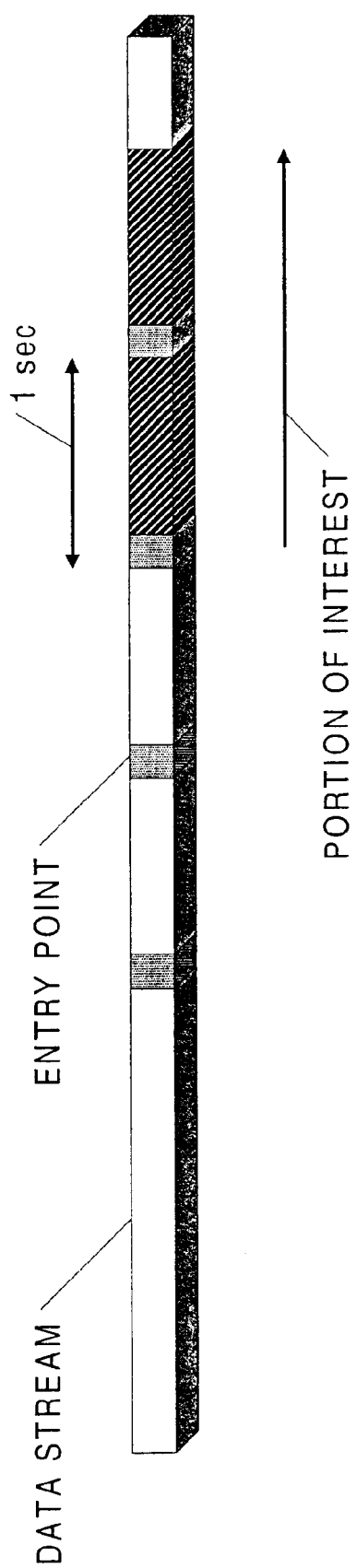
FIG. 7 illustrates how entry points are located in the preferred embodiment of the present invention; during the portion of interest, the entry points are located every 1 second; the entry points are also located two seconds before each portion of interest spaced with 1 second.

The processing unit 48 at this point does not perform a detection of the uniqueness of a signature and provides each signature to the time stamp generator 50. In the preferred embodiment, the processing unit is connected to an embedded PC module (OEMModule 486 from ZF Embedded Inc). In the preferred embodiment, the PC module has 16 Mb or Random Access Memory (RAM). The connection to this PC module is done via its ISA bus. The PC module runs Caldera DR-DOS V7.03. The time stamp generator is a program which runs on the PC module. The processing unit 48 provides therefore each signature to the time stamp generator 50 on the PC module via the ISA bus. The synchronization table 32 is located inside the RAM of the PC module for access speed purposes. The synchronization table 32 comprises two entries. The first entry is the signature which is, as previously explained, 64 bit long. The second entry of the synchronization table 32 is the frame number. The size of the frame number is 32 bits in the preferred embodiment. The frame number ($N_{frame}$) is directly related to the movie time and therefore allows a user to know the exact elapsed time ($T_{el}$) ($T_{el}=N_{frame}\times 32.10^{-3}$). A combination of these two entries is called an entry point. It is important to note that the synchronization table 32 comprises entry points only during portions of interest. A portion of interest is defined as a portion of the movie played by the audio/video player where it is mandatory to know the exact time for synchronization purposes. Entry points are present two seconds before and during a portion of interested and they are spaced by a one-second interval as shown in FIG. 7. During each entry point, and when it is necessary, an interpolation is performed in order to determine the exact time. The interpolation is performed by the time stamp generator using the conventional PC tick (interrupt 0x08 and 0x1C) of the PC module as a time base. Its rate is reprogrammed to 2000 interrupts per second. It will be appreciated that this rate allows a period of 500 ns which is a perfect multiple of the sampling frequency of the actuators (400 Hz). It is also interesting to note that there are 64 ticks per AC3 frame. 64 ticks have the duration of 3 DTS frames. Therefore, an internal clock which provides the elapsed time of a video stream with increments of 500 ns is available. This internal clock 26 is using a Frequency Locked Loop (FLL). The FLL consists in readjusting the clock divider that sets the rate of 2000 interrupts per seconds using the incoming frames.

In the preferred embodiment, the synchronization table is created using two main principles. The first principle states that an entry point should be placed two seconds before and during a zone of interest. The second principles states that the synchronization table cannot comprise an entry with a signature that occurs more than once in the whole soundtrack.

Now referring back to FIG. 5, the time stamps generated using the internal clock 26 and the synchronization table 32 are used by the effect trigger 28 to provide the effects related to the present portion if any. In the preferred embodiment, the effects are stored using three different types of file. The EFF.1 file 34 is loaded in the random access memory of the PC-Module in order to guarantee a rapid access. The EFF.2 file 36 is loaded into a Random Access Memory disk, which is created into an hard drive connected to the PC-Module using the IDE interface. In the preferred embodiment of the present invention, the hard drive has a size of 16 Mb. 15 Mb of the hard drive space are dedicated to the creation of the RAM disk. The .400 files 38 are stored either on a storage unit such as a CD-ROM unit connected to the PC-Module using the IDE interface or on the hard drive of the PC-Module.

Figure 8:
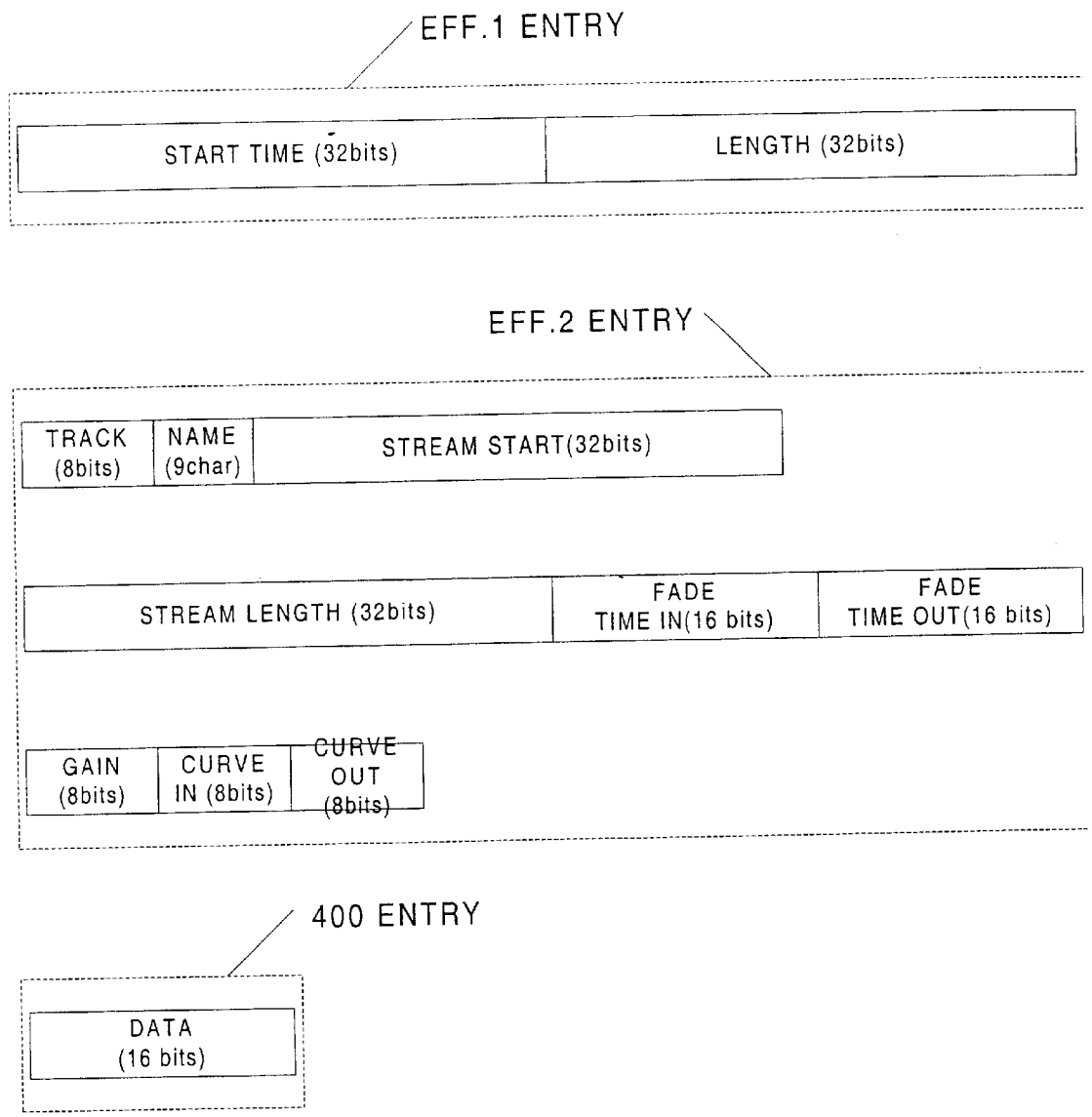
FIG. 8 shows the fields which are comprised in one entry of an EFF.1 file; in one entry of an EFF.2 file and one entry of a .400 file.

Now referring to FIG. 8, the EFF.1 file 34 comprises, in the preferred embodiment of the present invention, two fields. The first field is the time start of an effect, while the second field is the length or duration of an effect. The origin for the start time of an effect is the beginning of the movie in one embodiment of the present invention; any time position may be, in another embodiment, the origin. The value for both field are in milliseconds. The EFF.2 file 36 comprises 9 different types of fields in the preferred embodiment. The field entitled "track" number is an 8 bit number which refers to a special combination of actuators. In the preferred embodiment, 4 different actuators are used. In the preferred embodiment of the present invention, the special combination of actuators is composed of 2 different actuators, such as the two actuators located on the left, or the two actuators located on the right or the 2 actuators located on the front or finally the 2 actuators located on the back of the system so as supporting surfaces are coplanar. The first track may refer, for instance, to a combination of 2 actuators. The field entitled "name" refers to the name of the corresponding .400 file to play for the effect corresponding to this entry. The field entitled "stream start" refers to the time for the beginning of the effect with an origin. The field entitled "stream length" refers to the duration of the effect corresponding to the entry using millisecond units. The field entitled "fade time in" specifies the duration of a "fade" or a gain ramp at the beginning of an effect. The field entitled "fade time out" specifies the duration of a "fade" or a gain ramp at the end of an effect. These two fields offer smoothness. The field entitled "gain" relates to the gain that has to be applied to the samples. The gain ranges between 0% and 100%. The field entitled "curve in" refers to the type of ramp that may be applied at the beginning of an effect. A ramp may be linear, parabolic, exponential etc. . . . The field entitled "curve out" refers to the type of ramp that may be applied at the end of an effect. As for the previous one, a ramp may be linear, parabolic or exponential. It will be appreciated that the size of the field allows a great amount of combination possible. For instance, 8 bits allows 256 different values. In the case of the gain, it allows gain values from 0 to 100% with increments of 0.39%.

The .400 file comprises only one type of field. This type of field is a data field with a length of 16 bits. This 16 bit signed field is sent to the movement compilation 30.

Figure 9:
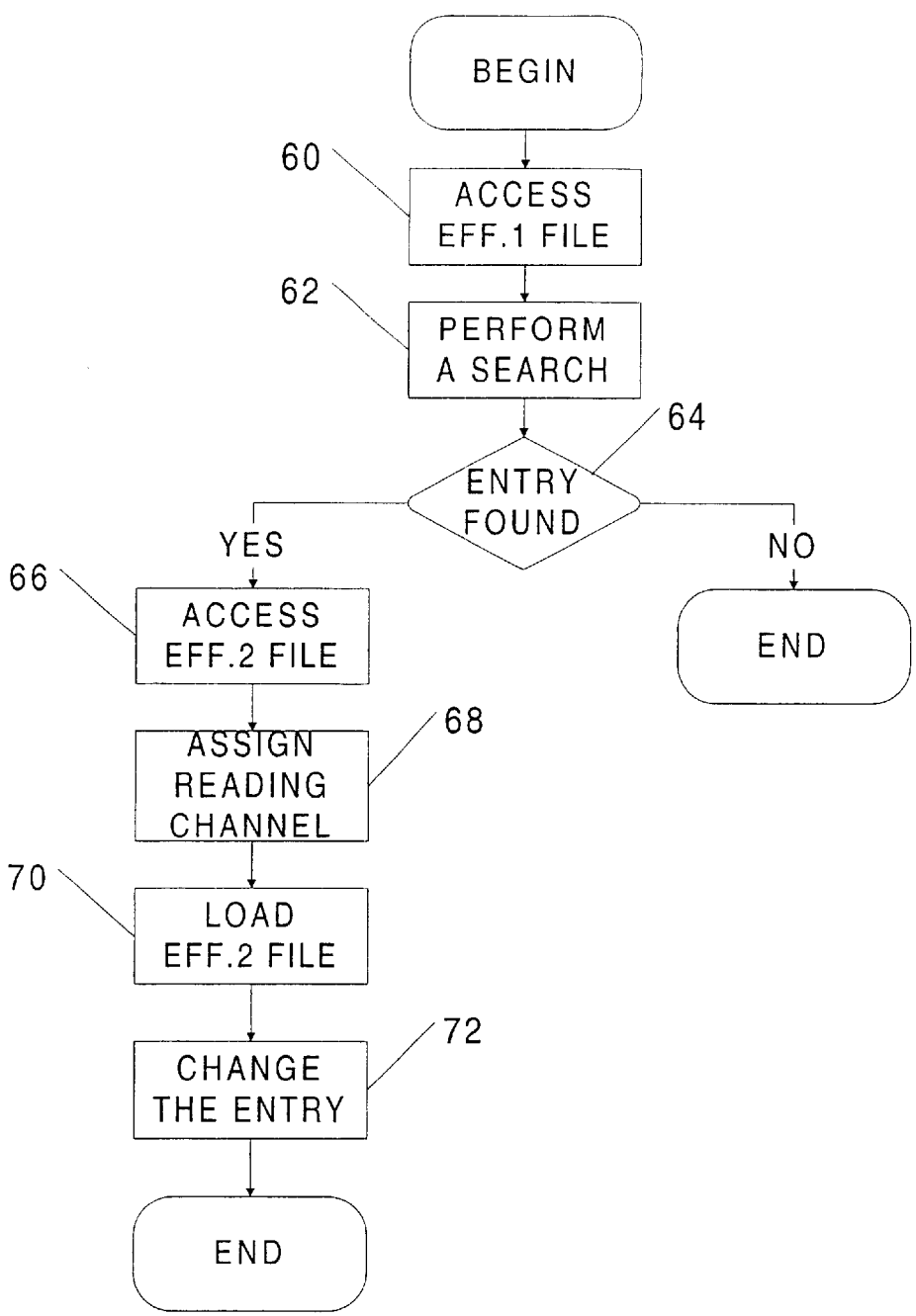
FIG. 9 shows a flow chart of the operation performed when reading an EFF.1 file.

Now referring back to FIG. 5, the effect trigger 28 receives the time stamps from the internal clock 26. FIG. 9 shows more clearly the actions performed by the program located inside the effect trigger upon reception of a time stamp in the preferred embodiment of the present invention.

According to step 60 of the present invention, the program performs access to the EFF.1 file located in the RAM of the PC-Module. A search in the EFF.1 file for an entry in the field "start time" is then performed according to step 62. In the preferred embodiment, a special technique is used in order to accelerate the search; this special technique consists in creating a buffer where links to entries in the EFF.1 that must be played in the following seconds are placed.

If an entry is located in the field "start time", at least one corresponding effect may be started. According to step 66, the EFF.2 file is accessed. As previously explained the EFF.2 file is located inside a RAM disk. A search is then performed in order to locate the first entry with a "stream start" that is equal to the last received time stamp. According to step 68, a reading channel is created. This reading channel comprises, in the preferred embodiment, the fields located in the EFF.2 for this first entry found. This reading channel is stored in RAM. This reading channel will remain in RAM during the whole duration of the effect. According to step 70 of the present invention, the EFF.2 file which comprises the core data corresponding to a particular effect is loaded in memory using the field "name" comprised in the program. One .400 file refers to one particular effect for an actuator. As previously explained, this file comprises 16 bit signed samples. The .400 file comprises information sampled at 400 samples per seconds. According to step 72 of the present invention, an access to the following entries in the EFF.1 file is performed in order to check if multiple effects may be started at the same time. If this the case, another reading channel will handle the effects found. Each reading channel provides a single signal to the movement compilation 30. Now referring back to FIG. 5, the reading channel signals are compiled by the movement compilation 30. The compilation consists in summing all the signals that must be provided to a certain actuator 18. Each reading channel created comprises a track field and as explained before, the track field refers to at least one combination of actuator. Therefore, it is possible, by reading the signal sent to the movement compilation by each reading channel and knowing the relation between a track number and a combination of actuator, to compute the global signal that must be provided to a single actuator 18. In the preferred embodiment, a limit value is imposed to the summation result in order to avoid damages to the actuators. Upon reception of each time stamp, all reading channel signals that handle effects and that should be over are killed, freeing up some memory.

Figure 11:
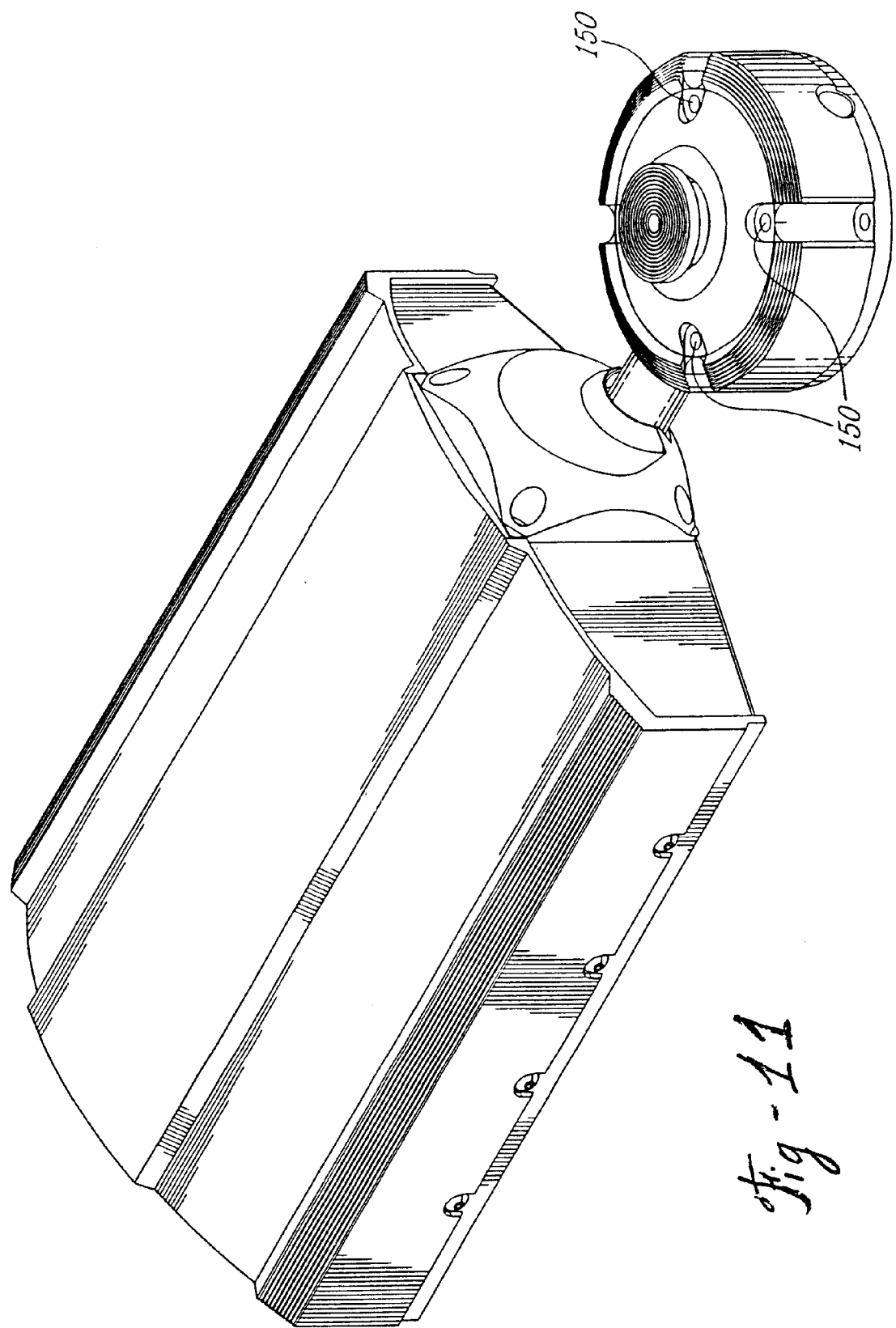
FIG. 11 shows a perspective view of a movement generator unit.

FIG. 11 illustrates a further construction of a movement generator unit 110 which is adapted to be placed under a leg of a chair to generate reciprocate movements thereat. Typically, such a movement generator unit is placed under each leg of a chair or at each corner of a platform on which the chair is mounted. The movement generator units are typically operated in pairs to generate a variety of movements.

Figure 12:
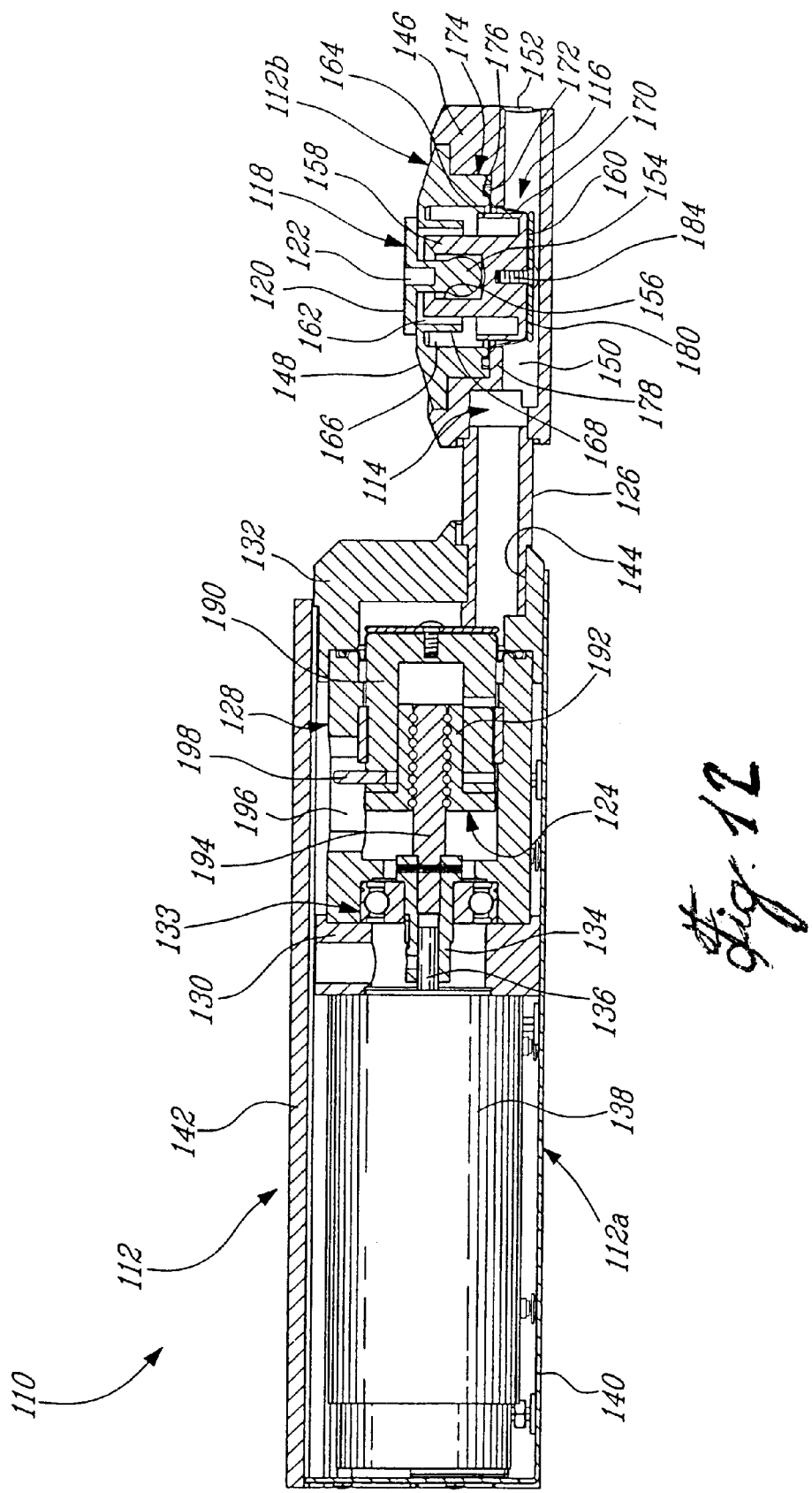
FIG. 12 shows a partially sectional view of the movement generator unit.

As shown in FIG. 12, the movement generator unit 110 generally comprises a base 112 defining a chamber 114 in which a first piston 116 is slidably mounted for raising and lowering a chair adaptor 118 having a leg supporting surface 120 defining an axially extending threaded bore 122 adapted to receive a fastener (not shown) for releasably securing one leg of a chair thereto. As will be seen hereinafter, a motor-driven piston 124 is also slidably mounted within the chamber 114 to displace the first piston 116 under fluid pressure.

The base 112 includes a main rectangular base member 112a and a secondary circular base member 112b connected to the main base member 112a by an intermediate tube 126. The main base member 112a includes a horizontal hollow cylinder 128 mounted between a pair of opposed end plates 130 and 132 attached to each other by means of axially extending threaded rods (not shown). A bearing 133 is mounted at one end of the cylinder 128 adjacent the end plate 130 for rotatably supporting a coupling 134 securely mounted on an output shaft 136 of a DSP-controlled brushless AC motor 138. The motor 138 could also be linear motor acting directly on the cylinder 190, and thus eliminating the need for the ball screw.

The cylinder assembly and the electric motor 138 are supported on a bottom plate 140 upon which a cover 142 can be releasably attached to form an enclosure. A bore 144 is defined in the end plate 132 for receiving the tube 126. The tube 126 is thereby connected in fluid flow communication with the interior of the hollow cylinder 128. The tube 126 is connected at its opposed end to a cylindrical body 146 forming part of the secondary base member 112b. A recess is defined in the top surface of the cylindrical body 146 for receiving a cover 148. Circumferentially space-apart holes 150 (FIG. 11) are defined in the cover 148 for receiving corresponding fasteners (not shown) in order to secure the cover 148 to the cylindrical body 146. The cover 148 and the cylindrical body 146 cooperate to define a cavity 150 which is in fluid flow communication with the tube 126 and, thus, the hollow cylinder 128. An inlet 152 is defined in the cylindrical body 146 for allowing the chamber 114, which is formed by the internal space of the hollow cylinder 128 and the tube 126, and the cavity 150, to be filled up with a liquid, such as oil. A closure (not shown) is provided for closing the inlet 152 once the chamber 114 has been filled up.

The chair adaptor 118 has a bottom ball formation 154 freely received in an axially extending socket 156 defined in an axially extending stem portion 158 of the first piston 116.

The stem portion 158 extends upwardly from a downwardly facing surface 160 of the first piston 116. A central opening 162 is defined in the cover 148 for allowing the stem portion 158 to project outwardly of the chamber 114. An annular peripheral wall 164 extends upwardly from the periphery of the downwardly facing surface 160 about the stem portion 158. The annular peripheral wall 164 is received in an annular recess 166 formed by a central cylindrical projection 168 depending downwardly from the inner surface of the cover 148. In operation, the first piston 116 moves vertically about the central cylindrical projection 168.

As seen in FIG. 12, a diaphragm or web member 170 has an integral peripheral ring 172 captively received in an annular seat 174 formed by an annular recess 176 defined in the inner surface of the cover 142 and an annular inner shoulder 178 defined in the cylindrical body 146. The web member 170 extends across a vertical section of the chamber 114 to act as a piston seal. The web member 170 has a central portion 180 which covers the downwardly facing surface 160 of the first piston 116 and which is secured thereto by means of a fastener extending through a disc 182 and into an axially extending threaded bore 184 defined in the downwardly facing surface 160 of the piston 116. The portion of the web member 170 extending between the peripheral ring 172 and the central portion 180 acts as a foldable skirt 186 which can telescope upon itself for allowing the first piston 116 to slide vertically within the chamber 114 while preserving the integrity of the piston seal. The downward movement of the first piston 116 will cause the skirt 186 to unfold, whereas the upward movement of the piston 116 will cause the skirt 186 to fold upon itself. The web member 170 is made of a flexible, pressure resistance, fluid impermeable material (i.e. rubberized nitrile).

A second web member 188 similar to the first web member 170 can be provided to act as a piston seal for the motor-driven piston 124. The duplicate description of the characteristics thereof will be omitted for brevity.

The motor-driven piston 124 generally comprises a cylindrical piston member 190 securely mounted on an internally threaded member 192, which is in turn threadably mounted on a motor-driven shaft 194 for longitudinal movements therealong in response to rotative movements of the motor-driven shaft 194. The member 194 is a ball screw spindle, and the member 192 is a ball screw nut. According to a preferred embodiment of the present invention, the cylindrical piston member 190 and the internally threaded member 192 are jointly displaced by a distance of ½ inch for four complete turns of the motor-driven shaft 194. By reversing the direction of rotation of the motor-driven shaft 194, the direction of travel of the cylindrical piston member 192 and the internally threaded member 194 is reversed, thereby allowing the motor-driven piston 124 to be reciprocated within a horizontal section of the chamber 114.

A longitudinal slot 196 is defined in the horizontal cylinder 128 for receiving a pin 198 supporting a bearing extending radially outwardly from the cylindrical piston member 190. The pin 198 is constrained to move within the slot 196, thereby preventing the cylindrical piston member 190 and the internally threaded member 192 from rotating with the motor-driven shaft 194. The motor-driven shaft 194 is drivingly connected to the coupling 134 which is, in turn, drivingly connected to the output shaft 136 of the electric motor 138.

In operation, the electric motor 138 receives a power drive signal from a motor controller and rotates the motor-driven shaft 194 in accordance with the received signal. For instance, when it is desired to raise the chair adaptor 118, the motor 138 rotates the motor-driven shaft 194 in an appropriate direction so as to axially displace the cylindrical piston member 190 against the fluid contained in the chamber 114. This will cause the first piston 116 to rise under the fluid pressure by a distance corresponding to the displacement of the cylindrical piston member 190. As will be appreciated, the cross-section ratio of the horizontal and vertical cylinder sections defines the actuator's linear transmission ratio. Knowing the pitch of the motor-driven shaft 194 and of the associated internally threaded member 192, it is possible to precisely control the mechanical movement transmitted to the chair adaptor 118.

When it is desired to lower the first piston 116, the motor-drive shaft 194 is rotated in the opposite direction so as to cause the retraction of the cylindrical piston member 190 into the horizontal cylinder 128, thereby allowing the first piston 116 to move downwardly under the load supported thereby. The retraction of the cylindrical piston member 190 also creates a "suction effect" which contributes to lower the first piston 116.

The position limits are detected by sensing the current drawn by the motor as a function of rotational position. Rotational position is detected using the optical encoder 12. The upper limit is determined by forcing the actuator upwardly until the upper edge of 164 contacts the upper edge of 166. At the point of contact, the current drawn will be great and the rotation zero, as measured by the encoder 12. The lower position can be detected by counting the rotation of the motor, or by detecting an increase in current near the bottom of the travel as screw 184 contacts the bottom plate of housing 146. The DSP is programmed to set "soft" limits for the upper and lower limits which are safely within the actual physical limits (e.g. within 10 to 15 mils above and about 60 mils below of physical limits). This prevents any knocking and any damage to the web member.

The hydraulic actuator according to the preferred embodiment has the ability to lift up to 400 hundred pounds and to move such a heavy mass in an oscillatory motion with about a 0.25" (6 mm) amplitude using a brushless DC motor (average power consumption of 100W) at up to 150 Hz and an acceleration of 2 g. The presently preferred nominal maximum operating frequency of the actuators is 100 Hz.

Creation of Effects

Figure 10:
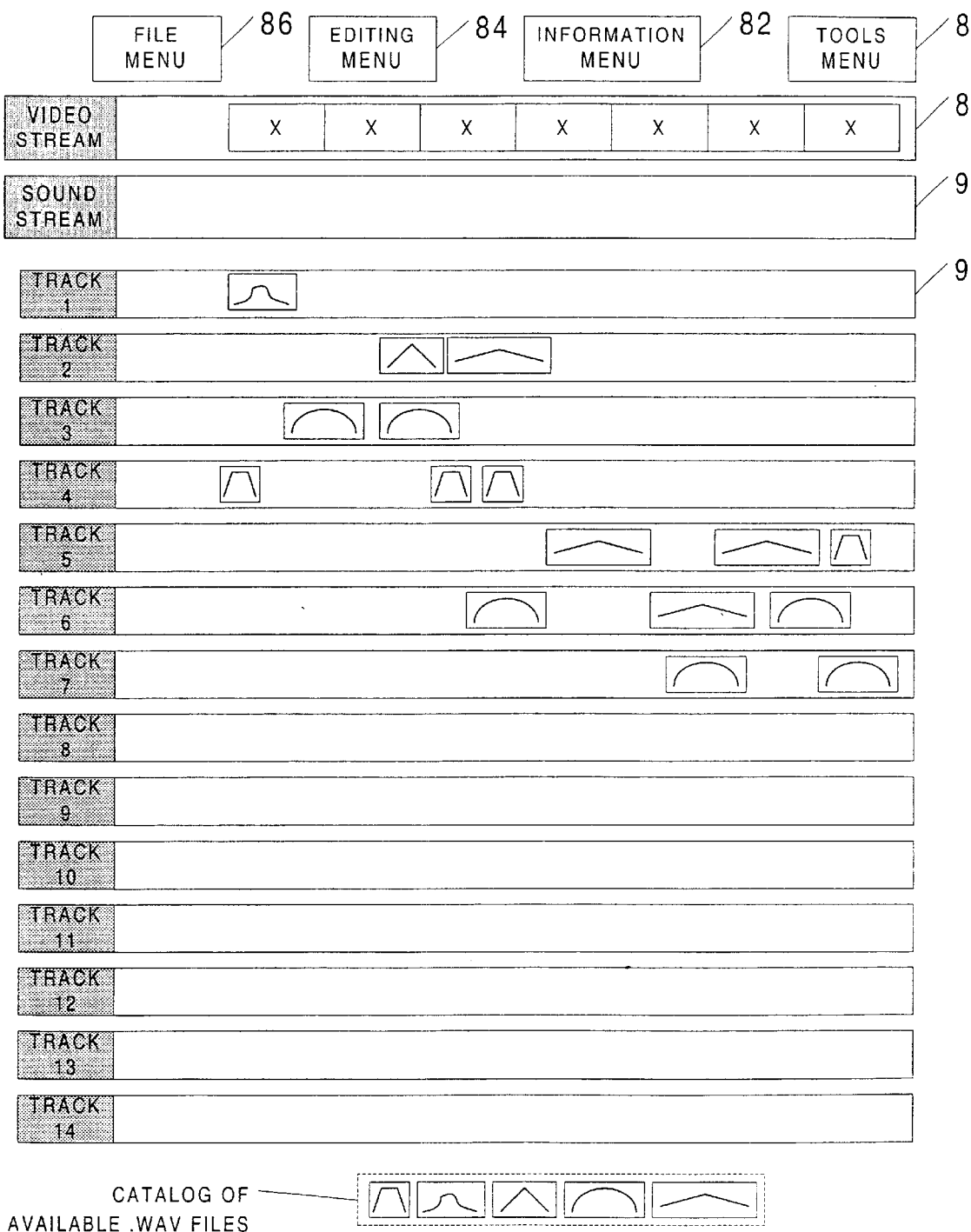
FIG. 10 shows a symbolic screen shot of the software used by an operator which implements effects on a movie file.

It will be also appreciated that this invention provides an efficient way to create effects. Now referring to FIG. 10, there is shown a symbolic screen shot of the software that the operator may use in order to create the effects. In the preferred embodiment, Vegas Video by Sonic Foundry is used. The screen shot comprises various menu such as a tools menu 80, an information menu 82, an editing menu 84, a file menu 86, a representation of the sound stream 90 and the video stream 88 as well as a certain amount of tracks 92. In the preferred embodiment, 14 different tracks are available. The audio video player 10 which is in the preferred embodiment a DVD player provides a bit stream that is converted into an .AVI format file in the preferred embodiment. The file menu 86 allows the operator to load the .AVI file. An information menu 82 provides an indication of the current elapsed time. A tools menu 80 provides to the operator an opportunity to create various effects.

At different places, the operator can select, from a catalog of available .WAV files available, one specific file to use. This file is an effect to send to at least one actuator. This file is represented, on the screen, with a certain shape and it can be inserted on any tracks such as track 92. A track is, as explained previously a group of at least one actuator. The operator can create new .WAV files using CoolEdit software. The .400 file is only a conversion of the .WAV file used during the creation of the effects and is, as previously explained, a succession of signed 16 bits without any headers. It will be appreciated that the creation of the .400 file can be done graphically by creating and modifying a shape of a .WAV file. Therefore any type of effect can be created and thus inserted within one track. In the preferred embodiment, a 3 hours film may require about 200 .400 files. It will be also appreciated that a .WAV file can be reused at different portion of the movie as shown on FIG. 10. Therefore, as the tracks 92 are linked with the video stream 88 and the sound stream 90, this interface gives to the operator of the system an interesting opportunity to visualize the result of his work and to edit it in an easy using drag and drop features for instance. When the editing process of the tracks is completed, a file is generated. This file comprises information such as: the track number, the beginning of an effect, the length of an effect etc. This file is used to generate the EFF.1 and the EFF.2 file. The generation of this file consists in selecting certain part of the generated file to create each file. In the preferred embodiment, the .WAV files used by the operator are 8 kHz sampled file, therefore they must be converted into 400 Hz .400 files order to be used by a user. As previously explained, the .400 file for the user is sampled at 0.4 kHz. In order to obtain a good synchronization between the effect and the movie track, practical experiments suggested that an 80 ms delay should be taken in order when inserting effects on each track during the creation process. During the playback mode, an average of 20 ms should be taken into consideration.

When no effects have been previously created, a computer may provide to the apparatus reading the channel signals each effect to play. For instance, a flight simulator may generate in accordance with the simulation events both vibrations and motion cues. The vibration and motion cue signals generated by the simulation software can then be converted to actuator position values and combined. The combined actuator position values can then be provided using, for example, a Universal Serial Bus (USB) port as the reading channel signals according to movement of the aircraft in real time. It will be appreciated by someone skilled in the art, that because of its nature, this invention may enable a user to feel simultaneously visual cue movements and vibrations. In the preferred embodiment the hydraulic actuator works with a frequency up to 150 Hz, and such a wide frequency range enables a flight or game simulator enthusiast to feel the vibrations of the engine(s) of planes ranging from propeller planes up to turbo jets, as well as a wide range of motor vehicles and other virtual environments.

What is claimed is:

1. An apparatus for generating a synchronized motion effect for at least one actuator using an audio/video source stream signal, said apparatus comprising:
   a track analyzer, receiving an audio/video source stream signal comprising a plurality of data packets and extracting a portion of interest in a data packet of the plurality of data packets;
   a synchronization database comprising a plurality of time codes, each related to a specific sequence of data comprised in the portion of interest of a data packet;
   a time code generator receiving and providing the extracted portion of interest of the data packet to the synchronization database, the time code generator further receiving a corresponding time code signal from the synchronization database; and
   an effect generator receiving the time code signal from the time code generator and providing an effect signal, from a stored effect database, synchronized to that time code signal, to at least one actuator.

2. The apparatus as claimed in claim 1, wherein said audio/video source stream signal is a DTS or a AC3 frame.

3. The apparatus as claimed in claim 2, wherein the portion of interest comprises the CRC1 field, one byte located at $1/5$ of the AC3 frame, one byte located at $2/5$ of the AC3 frame, one byte located at $3/5$ of the AC3 frame, one byte located at $4/5$ of the AC3 frame and the CRC2 field located at the cud of the AC3 frame.

4. The apparatus as claimed in claim 1, wherein the time code signal represents an elapsed time from an origin.

5. The apparatus as claimed in claim 1, wherein the stored effect database comprises a plurality of effect signals, the stored effect database further comprising at least one file, the at least one file comprising raw effect data.

6. The apparatus as claimed in claim 5, wherein at least one part of said stored effect database is stored in Random Access Memory (RAM) or Random Access Memory (RAM) disk.

7. The apparatus as claimed in claim 5, wherein raw effect data are .wav file format having a sampling frequency of about 400 Hz.

8. The apparatus as claimed in claim 1, wherein the time code generator comprises an interpolating unit receiving a current time code signal from the synchronization database and providing a time code signal using an internal clock.

9. The apparatus as claimed in claim 8, wherein the plurality of time codes are interspersed throughout the audio/visual stream signal.

10. The apparatus as claimed in claim 1, wherein the effect signal is provided to at least three actuators, the at least three actuators supporting a sofa.

11. A method for performing a synchronized effect using a time code in a datastream comprising a plurality of data packets, the method comprising the steps of:
   defining a portion of interest in a data packet of a datastream;
   creating a synchronization database comprising a plurality of time codes each related to a specific sequence of data comprised in the portion of interest of a packet of the datastream;
   receiving a packet of the datastream;
   extracting die portion of interest of the received packet of the datastream;
   accessing the synchronization dathbase using at least the portion of interest of the received packet;
   providing a corresponding time code related to the packet to a generator effect;
   providing an effect related to said provided corresponding time code; and
   actuating at least one actuator using the provided effect.

12. The method as claimed in claim 11, wherein the portion of interest has a substantially large probability distribution.

13. The method as claimed in claim 11, wherein the step of creating a synchronization database comprises verifying that each said specific sequence of data in said synchronization database is unique with respect to each portion of interest of the datastream, wherein only unique specific sequences of data are included in said synchronization database.

14. The method as claimed in claim 11, wherein the datastream is an AC3 or DTS frame.

15. The method as claimed in claim 11, wherein the providing of an effect related to said provided corresponding time code comprises the accessing of a database comprising a list of effects to be played with respect to a time code to retrieve an identification of an effect to be played, the method further comprising the step of accessing a raw data effect database using the identification of the effect to be played and retrieving the effect.

16. The method as claimed in claim 11, wherein the step of providing the effect comprises playing a .wav file.

17. The method as claimed in claim 11, wherein the step of providing an effect comprises providing visual cue effect and vibration effect synchronized with the datastream.

* * * * *